United States Patent
Klein

(10) Patent No.: US 10,970,832 B2
(45) Date of Patent: Apr. 6, 2021

(54) IMAGE DATA FOR IMPROVING AND DIAGNOSING SPRINKLER CONTROLLER PERFORMANCE

(71) Applicant: Rachio, Inc., Denver, CO (US)

(72) Inventor: Christopher M. Klein, Denver, CO (US)

(73) Assignee: RACHIO, INC., Denver, CO (US)

( * ) Notice: Subject to any disclaimer, the term of this patent is extended or adjusted under 35 U.S.C. 154(b) by 224 days.

(21) Appl. No.: 16/050,437

(22) Filed: Jul. 31, 2018

(65) Prior Publication Data

US 2019/0035071 A1    Jan. 31, 2019

Related U.S. Application Data

(60) Provisional application No. 62/538,969, filed on Jul. 31, 2017.

(51) Int. Cl.
*G06K 9/00* (2006.01)
*G06T 7/00* (2017.01)
*G06Q 10/00* (2012.01)

(52) U.S. Cl.
CPC ........ *G06T 7/0004* (2013.01); *G06K 9/00657* (2013.01); *G06K 9/00771* (2013.01); *G06Q 10/20* (2013.01); *G06T 7/00* (2013.01); *G06K 2209/27* (2013.01); *G06T 2207/10016* (2013.01); *G06T 2207/20076* (2013.01); *G06T 2207/30188* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 9,883,114 B2* | 1/2018 | Einecke | G05D 1/0246 |
| 2010/0030389 A1* | 2/2010 | Palmer | H05B 47/16 700/284 |
| 2010/0263275 A1* | 10/2010 | Anderson | A01G 25/167 47/58.1 R |
| 2011/0106320 A1* | 5/2011 | Hall | A01G 25/165 700/284 |
| 2011/0166715 A1* | 7/2011 | Hoffman | A01B 79/005 700/284 |
| 2012/0037725 A1* | 2/2012 | Verfuerth | A01G 25/16 239/289 |
| 2013/0153673 A1* | 6/2013 | Younis | A01G 25/16 239/1 |
| 2015/0188982 A1* | 7/2015 | Punnakkal | H04L 67/025 709/203 |

(Continued)

*Primary Examiner* — Hadi Akhavannik
(74) *Attorney, Agent, or Firm* — Dorsey & Whitney LLP

(57) ABSTRACT

Systems and methods for diagnosing and facilitating repair of system components and/or improving watering schedules are disclosed. In one embodiment, a method of diagnosing a sprinkler system component is disclosed that includes initiating a sprinkler system zone run for a particular zone of a sprinkler system, capturing image data for the sprinkler system run, uploading the image data to a network node, processing the image data at the network node to produce data on the sprinkler system or a sprinkler system component, and generating an action item for the sprinkler system or sprinkler system component based on the data produced at the network node.

6 Claims, 8 Drawing Sheets

(56) References Cited

U.S. PATENT DOCUMENTS

| | | | |
|---|---|---|---|
| 2015/0230417 A1* | 8/2015 | Nickerson | A01G 25/167 700/284 |
| 2015/0309496 A1* | 10/2015 | Kah, III | A01G 22/00 700/284 |
| 2015/0349941 A1 | 12/2015 | Papasakellariou et al. | |
| 2016/0100086 A1* | 4/2016 | Chien | G01J 5/041 348/143 |
| 2016/0157414 A1* | 6/2016 | Ackerman | G05D 1/0274 701/25 |
| 2016/0202679 A1* | 7/2016 | Bermudez Rodriguez | G05B 15/02 700/284 |
| 2018/0213731 A1* | 8/2018 | Wykman | A01C 21/007 |
| 2019/0141919 A1* | 5/2019 | Kundra | G06K 9/00765 348/159 |

\* cited by examiner

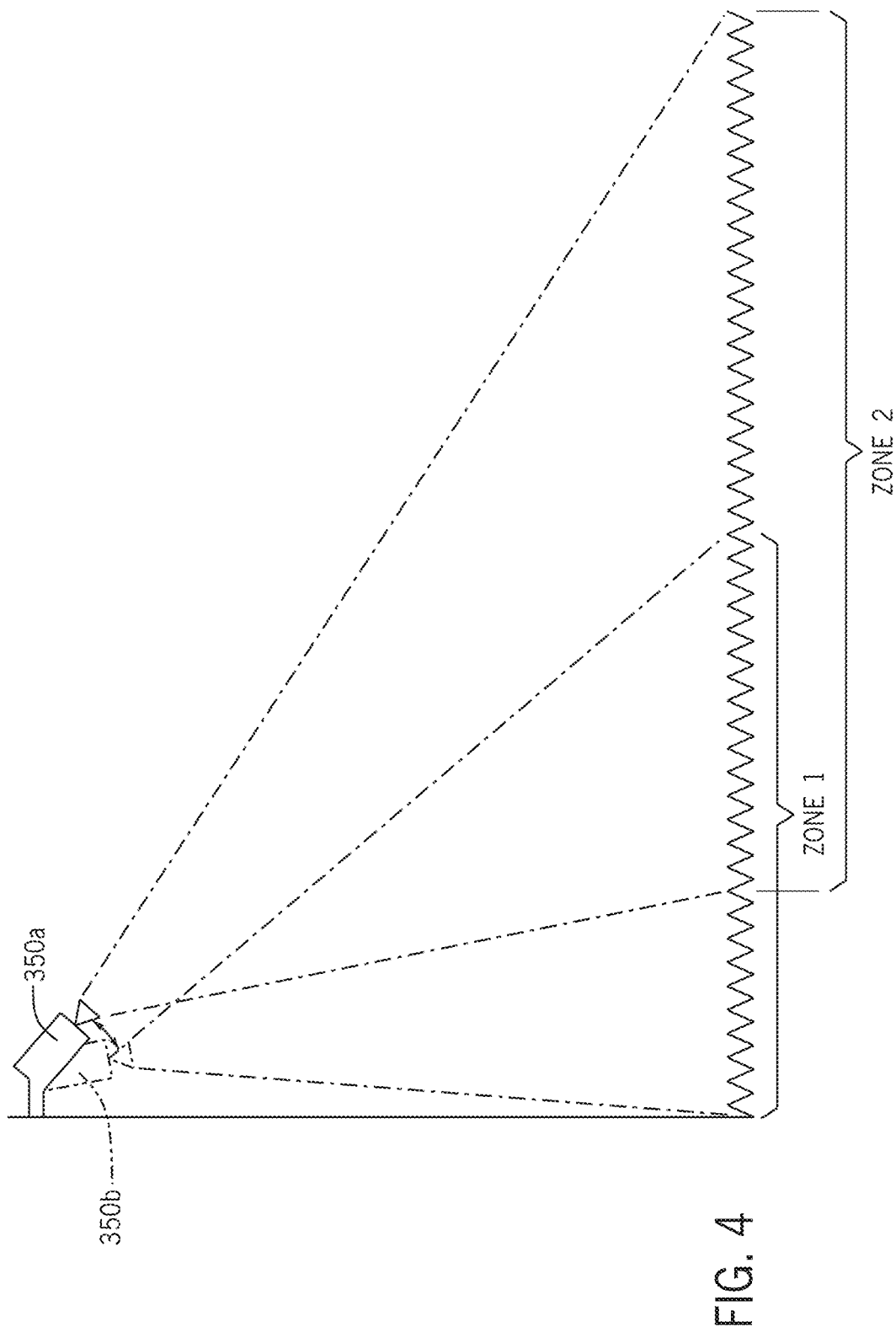

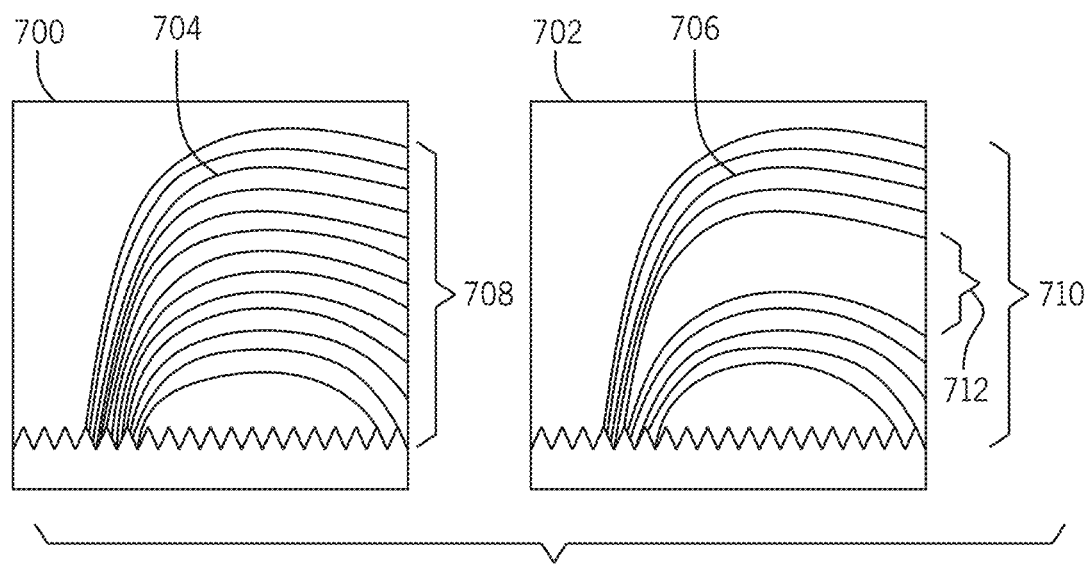
FIG. 7
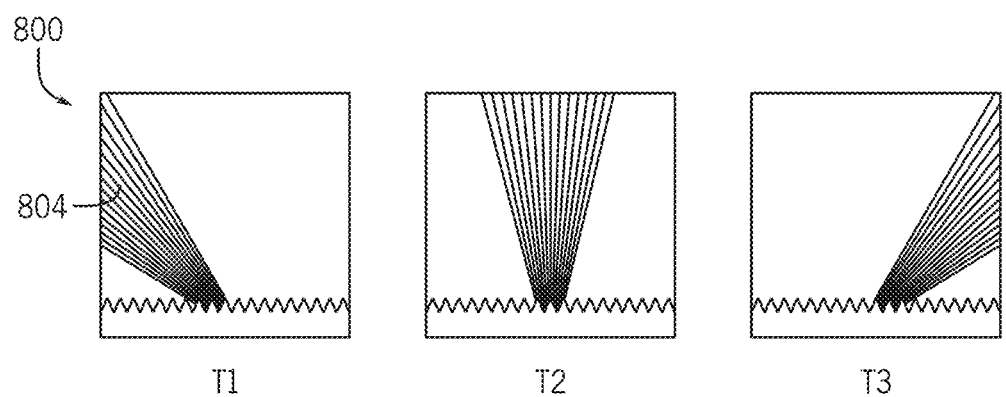
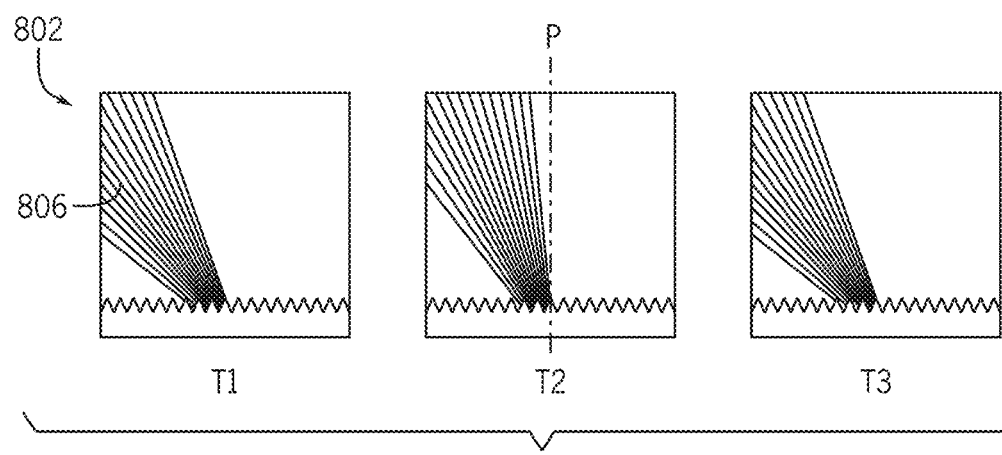
FIG. 8

IMAGE DATA FOR IMPROVING AND DIAGNOSING SPRINKLER CONTROLLER PERFORMANCE

CROSS REFERENCE TO RELATED APPLICATIONS

This application claims the benefit of U.S. Provisional Application No. 62/538,969, filed on Jul. 31, 2017 and entitled "Image data for improving and diagnosing sprinkler controller performance," the entirety of which is incorporated herein by reference for all purposes.

FIELD

The present disclosure relates generally to methods and systems for improving performance of smart sprinkler systems via analysis of image data.

BACKGROUND

Conventional landscaping sprinkler systems have their irrigation schedules set manually at the beginning of a watering season and are typically not adjusted based on weather. Additionally, homeowners typically lack knowledge about landscaping and sprinkler systems to create an optimal irrigation schedule. The result is often an over-watered lawn with wasted water as runoff, an under-watered lawn, or both, depending on the sprinkler zone or location within the sprinkler zone.

Recent advances in watering systems include smart watering systems. Smart watering systems control irrigation schedules of a sprinkler system. This may include automatically updating irrigation schedules based on qualitative and quantitative feedback and meteorological data. Smart sprinkler systems may match optimal or near-optimal irrigation schedules to sprinkler zones based on landscaping and sprinkler system characteristics. An example of a smart watering system is disclosed in U.S. Patent Application Publication No. 2015/0319941, entitled "System and method for an improved sprinkler control system," filed May 6, 2014, which is incorporated herein by reference for any and all purposes.

Although smart watering systems can enhance watering, there remains a need for new and improved designs. In particular, there remains a need for systems and methods that provide improved diagnostic methods for facilitating repair of system components and/or improving watering schedules.

SUMMARY

In one embodiment, a method of diagnosing a sprinkler system component is disclosed. The method may include initiating a sprinkler system zone run for a particular zone of a sprinkler system, capturing image data for the sprinkler system run, uploading the image data to a network node, processing the image data at the network node to produce data on the sprinkler system or a sprinkler system component, and generating an action item for the sprinkler system or sprinkler system component based on the data produced at the network node.

In another embodiment, a method of adjusting parameters in a sprinkler system is disclosed. The method may include initiating a sprinkler system zone run for a particular zone of a sprinkler system, capturing image data for the sprinkler system run, uploading the image data to a network node, processing the image data at the network node to produce data on watering patterns associated with the sprinkler system, and adjusting water parameters for the sprinkler system based on the data produced at the network node.

In some embodiments, capturing image data includes recording a video from a camera associated with a mobile phone. The mobile phone used to capture the image data may additionally be used to upload the image data to the network node. In some embodiments, the operations of initiating the sprinkler system run and capturing image data are simultaneously triggered through user actuation of an icon provided in a user interface.

In another embodiment, a sprinkler system is disclosed. The sprinkler system may include a sprinkler, a flow controller operatively coupled to the sprinkler, a server in electrical communication with the flow controller, and a camera in electrical communication with the server. The image data captured by the camera may be transmitted to the server for processing to determine whether to make an adjustment to the sprinkler system.

In yet another embodiment, a method of improving vegetation health watered by a sprinkler system is disclosed. The method may include receiving by a processing element zone image data corresponding to a first irrigation zone watered by the sprinkler system; analyzing by the processing element the zone image data to determine health of the vegetation within the first irrigation zone and watering characteristics of one or more spray heads responsible for watering the first irrigation zone; adjusting by the processing element a first irrigation schedule for the first irrigation zone to increase or decrease at least one of watering time or watering amount; and transmitting by the processing element the first irrigation schedule to a sprinkler controller for execution of the irrigation schedule to water the first irrigation zone.

BRIEF DESCRIPTION OF THE DRAWINGS

FIG. 4 is an example illustration of a camera coupled to the system to capture image data from different irrigation zones at various time intervals.

FIG. 7 illustrates an image analysis to determine defects in system components.

FIG. 8 illustrates an image sequence analysis to detect defects in system components.

SPECIFICATION

Overview

Figure 1:
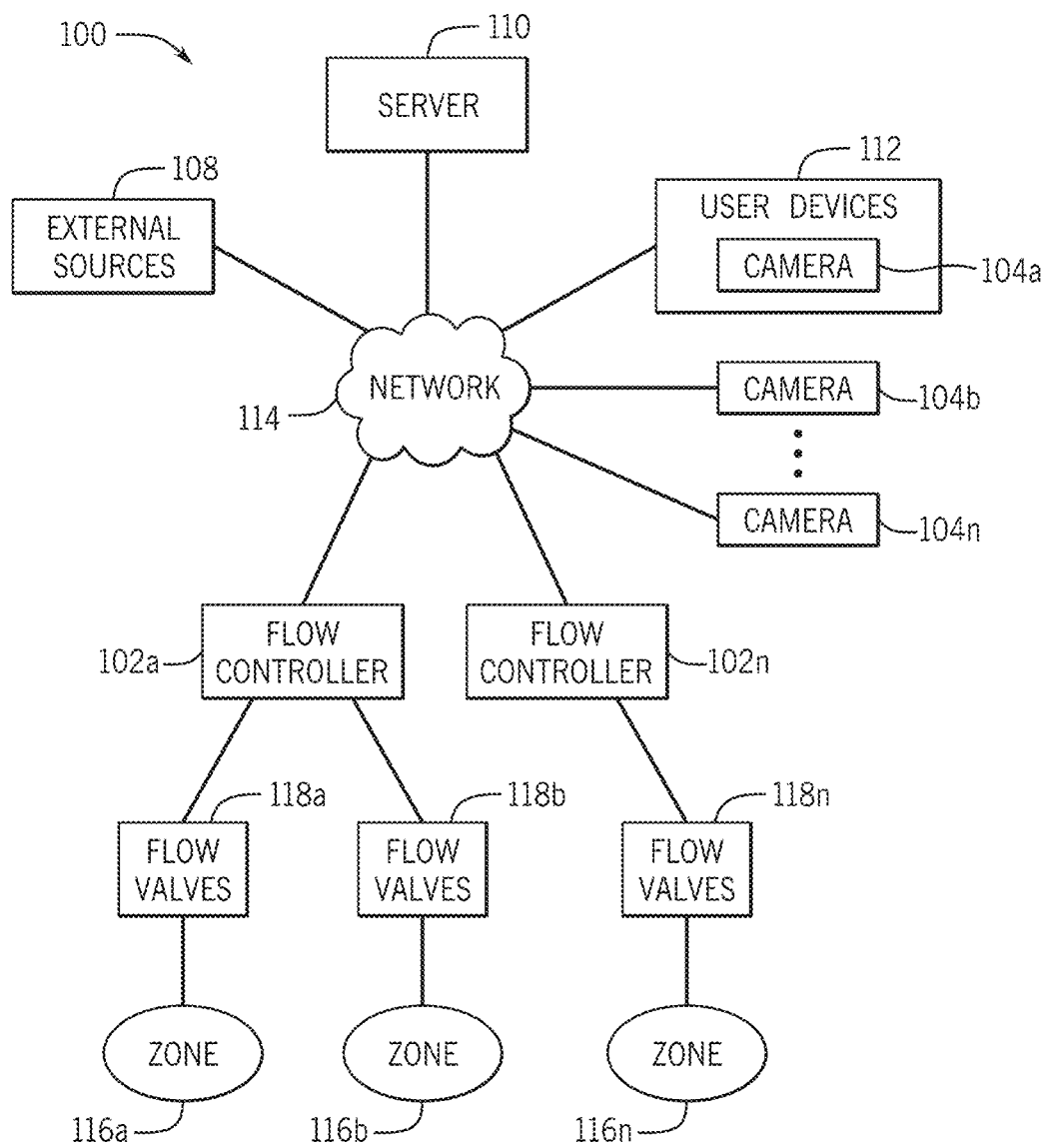
FIG. 1 is a block diagram illustrating an example system for improving and diagnosing sprinkler controller performance using image data in accordance with the present disclosure.

The present disclosure is directed to systems and methods that provide improved diagnostic methods for facilitating repair of sprinkler or other irrigation system components and/or improving watering schedules. In one example, the present disclosure is directed to a method for integrating image data, such as a video recording or still images, with the operation of specific flow controller zones. The image data can then be used to document usage of the sprinkler system and/or sprinkler system equipment for diagnostic or other purposes. By utilizing video or other image data, a system in accordance with the present disclosure can capture significant amounts of rich detail about a sprinkler zone functionality and its associated sprinkler system operation. In some embodiments, video or other image data is captured with a user's mobile phone camera, security system camera, Internet of Things (IoT) devices (e.g., in-home cameras), drone, satellite, or other similar device that provides for convenient and easy integration with the sprinkler system. Audio data may also be captured with or without accompanying video so as to provide an additional source of data for the sprinkler system.

Image data of a sprinkler system or usage of a sprinkler system in accordance with the present disclosure may be used to avoid problems commonly encountered by home owners or other users of sprinkler systems. For example, currently, if a homeowner wants to capture information about a broken sprinkler head via video that could then either be sent to a professional service provider for repair purposes, or used at the local hardware store to ask department specialist about the break, the homeowner would need to undertake a series of cumbersome steps. For example, one device would need to activate a sprinkler zone. Another device, that would possibly be in a different location from or otherwise not integrated with the device that started the sprinkler system zone run, would need to record video. While mobile phones could be used to capture the image data, with current systems, the image data would need to be captured via a separate camera application and stored on the user's device in some manner that may not allow for easy transfer to a professional service provider.

In accordance with the present disclosure, a homeowner can capture video of the sprinkler zone run from a dedicated application running on his or her mobile phone or other user device. The dedicated application may include functionality to start the sprinkler system run, enable the camera, and store the image data. This arrangement provides many advantages, including the fact that the image data may be captured from the very start of the sprinkler zone run. By way of example, the dedicated application may provide the homeowner the option of running a zone or running a zone and recording image data. With the recording option, the dedicated application records image data such as, for example, video and audio and then stores the image data for later analysis and/or other use. In some examples, the dedicated application stores the image data on cloud servers or other network based servers. Storage of the image data in this manner, may allow the homeowner to share the image data with his or her landscaper or other technician through shared access. Additionally, because the image data is stored on a cloud server or other network based device, the video may be specifically associated with the sprinkler zone from which the video was captured such that the image data is stored as a historical event for that zone.

Other embodiments in accordance with the present disclosure do not necessarily use a mobile device to capture and upload image data. In one example, the smart sprinkler system may capture and upload sprinkler system image data via one or more stand-alone cameras that may be maintained on the property associated with the sprinkler system. For example, the system may utilize an outdoor security camera for capture of sprinkler system image data. In this implementation, the outdoor security camera or other camera coupled to the system may be in communication with the smart sprinkler system such that the security camera or the security system itself can upload image data to a server or other network node.

In another example, the present disclosure is directed to a method for correlating image data to a flow controlled zone and using those correlations to adjust sprinkler fluid flow. The image data can be generated from cameras, video, still images, and satellite imagery in accordance with various embodiments. For example, a homeowner may capture video of a given zone using a run and record feature of a dedicated application, which then may upload the video to a cloud server or other network device. The cloud server or other networking device may then process the video footage, run the video footage against trained models, analyze a current watering schedule, and then determine the watering needs of that specific zone. In some cases, determining watering needs may include adding or removing duration or frequency of a zone run. In another example, a homeowner or other sprinkler system operator may set up an integration with an outdoor camera system to take daily pictures of one or more watering zones and then send that daily information to a network node for processing through similar algorithms. In another example, a homeowner may take a picture of vegetation in a zone and send it to a network node to process the image through similar algorithms.

Supplemental data, such as user input, weather data, regional information, or the like, can be used, along with the captured images to provide the image data that is analyzed by the system. The supplemental data can be provided directly from the server or the controller, from external sources, or from the user device.

DETAILED DESCRIPTION

Turning now to the figures, the system and methods of the present disclosure will be discussed in more detail. FIG. 1 is a block diagram illustrating an example system 100 for improving and diagnosing sprinkler controller performance and/or improving watering schedules using image data. The system 100 includes one or more flow controllers 102*a* and 102*n* (collectively, "flow controllers 102"), external sources 108, one or more servers 110, and one or more user devices 112. One or more of the various components of the system 100 (or data from those components) may be interconnected together and in communication with one another through a network 114. The system 100 may additionally include cameras 104*a*, 104*b*, 104*n* (collectively "cameras 104"). In one example, a camera 104*a* may be a component of a user device 112, such as a cellular or mobile phone. In another example, a camera 104*b* may be a stand-alone device such as, for example, a camera that is associated with a home security system, IoT device, or the like.

The flow controller 102 controls or regulates flow to one or more flow devices, such as one or more sprinklers (e.g., pop-up sprinklers, rotating sprinklers, and impact sprinklers), drip-irrigation tubes, or the like. In one example, the flow controllers 102 control the operation of a plurality of flow valves 118a, 118b, 118n (collectively, "flow valves 118") that supply water to flow devices corresponding to one or more watering zones 116a, 116b, 116n (collectively, "watering zones 116"). The flow valves 118 can be electronically-operated flow valves, such as solenoid valves, that open and close a flow path to a sprinkler head. The flow controllers 102 may cause one or more signals to be sent to the flow valves 118 to control operation of the valves 118. An example of a flow controller 102 that may be used with the system 100 can be found in U.S. Publication No. 2015/0319941, filed on May 6, 2014 and entitled "System and method for an improved sprinkler control system," which is incorporated herein by reference.

In one example, the flow controller 102 polls the server 110 to determine whether to take an action, such as opening or closing one or more flow valves 118. In another example, the flow controller 102 takes actions based on messages received from the server 110 (e.g., the server 110 sends a command to the flow controller 102 to open a valve 118). In yet another example, the flow controller 102 receives a batch of instructions (e.g., an entire month's schedule) from the server 110 at one time. In this manner, the flow controller 102 may be resilient to network connectivity problems. The server 110 can periodically push an updated set of instructions to the flow controller 102 or the flow controller 102 can poll the server 110 to determine if there is an updated set of instructions (e.g., based on weather conditions). The instructions can be formatted as a data structure having a series of scheduled start and stop times (e.g., a UNIX timestamps) for particular flow valves 118. A processor of the flow controller 102 compares a current time with a scheduled action time. Using the comparison, the processor can cause the flow controller 102 to take a particular action, such as opening or closing one or more flow valves 118. In this manner, the flow controller 102 controls the flow of water to a flow device. In one example, the flow controller 102 only has access to and information regarding the valves it can directly control. For instance, the flow controller 102 does not have information regarding other flow controllers 102 on a property.

The external sources 108 are data and/or sensors from various devices or information hubs. The external sources 108 can include computing devices, such as servers, user devices, or the like, that include data on environmental factors (e.g., weather tracking), utility information (e.g., average water usage for a neighborhood or house, average water pricing rates, watering restrictions, etc.), smart home devices (e.g., smart thermostat, alarm system), or the like. The external sources 108 may be devices that provide environmental or external data that is relevant or correlates to the system 100.

The server 110 is a computing device that processes and executes information. The server 110 may include its own processing elements, memory components, and the like, and/or may be in communication with one or more external components (e.g., separate memory storage). An example of computing elements that may be included in the server 110 is disclosed below with respect to FIG. 10. The server 110 may also include one or more server computers that are interconnected via the network 114 or separate communicating protocol. The server 110 may host and execute a number of the processes executed by the system 100 and/or the flow controller 102. In some embodiments, each flow controller 102 may communicate with specialized servers 110 that communicate with a specialized system server 110 or each may communicate with the same server 110 or groups of servers.

The user devices 112 are various types of computing devices, such as smart phones, tablet computers, desktop computers, laptop computers, set top boxes, gaming devices, wearable devices, voice command devices, internet of things hubs, or the like. The user devices 112 provide output to and receive input from a user. For example, the server 110 transmits one or more alerts to the user device 112 to indicate information regarding the flow controller 102. The type and number of user devices 112 may vary as desired and may include tiered or otherwise segmented types of devices (e.g., primary user device, secondary user device, guest device, or the like).

The network 114 may be substantially any type of or combination of types of communication systems for transmitting data either through wired or wireless mechanism (e.g., WiFi, Ethernet, Bluetooth, cellular data, or the like). In some embodiments, certain devices in the system 100 may communicate via a first mode (e.g., Bluetooth) and others may communicate via a second mode (e.g., WiFi).

The zones 116 may be irrigation areas having particular properties. The zones 116 can be areas logically or physically separated by location (e.g., front yard zone, back yard zone, garden zone, etc.), characteristics (e.g., soil type, vegetation type, incline, etc.), flow device coverage (e.g., based on areas to which particular flow valves 118 supply water), connections in the flow controllers 102, or based on other factors. The zones may be distinct or they may overlap. Flow devices may irrigate the zones 116 and the flow devices may receive water from flow valves 118 operated by one or more of the flow controllers 102.

Figure 2:
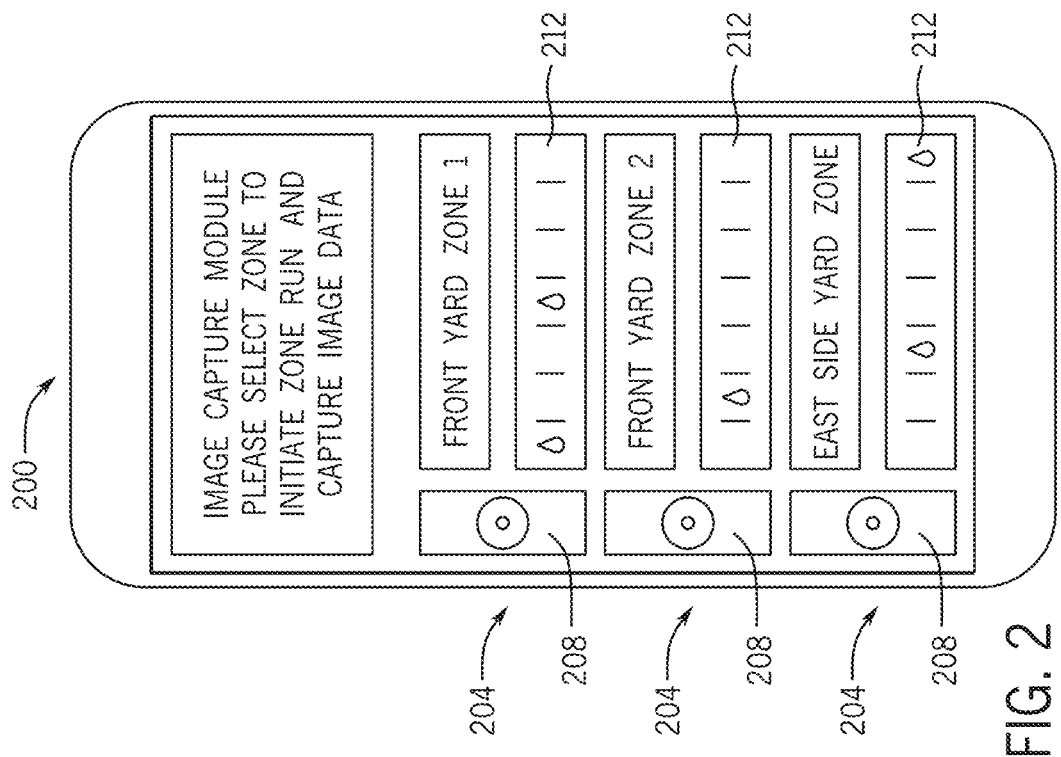
FIG. 2 is an example illustration of a user interface in accordance with the present disclosure for capturing image data for one or more sprinkler system zones.

FIG. 2 illustrates an example user interface 200 on a user device 112 for capturing image data for one or more sprinkler system zones 116. The user interface includes entries 204 corresponding to zones 116 of a sprinkler system 100. The entries 204 each include a run and record icon 208 that may be selected to initiate a sprinkler zone run for a given zone 116, as well as to enable a camera 104a that is a component of the user device 112. Each run and record icon 208 may be arranged adjacent to or otherwise in combination with a representation of the zone's schedule 212. As illustrated, the schedule 212 uses water drops within seven areas to indicate that the zone 116 is going to be watered on a particular day of the week. This view shows that a first view controller 102a controls watering schedules for a front yard zone 1, a front yard zone 2, and an east side yard zone.

Figure 3:
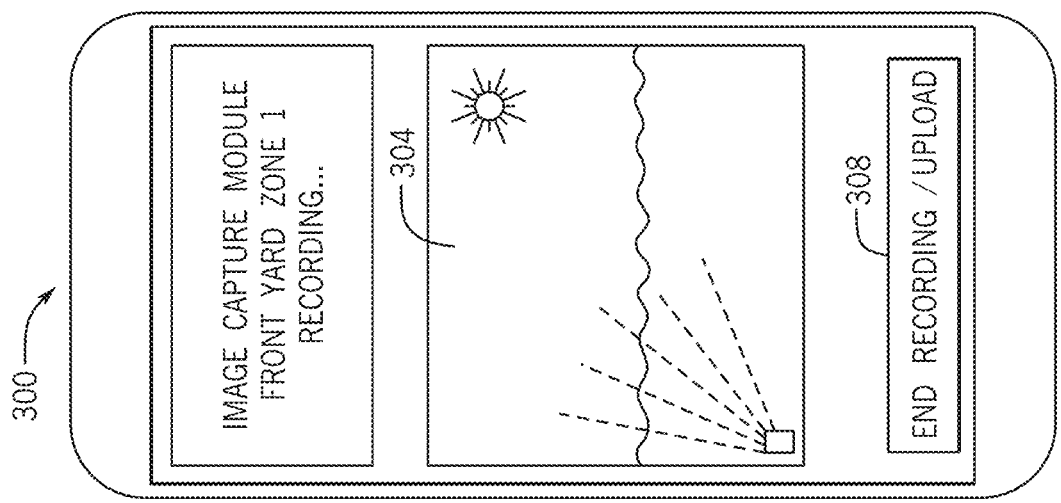
FIG. 3 is an example illustration of a user interface in accordance with the present disclosure that may be displayed in response to a user selection of a run and record icon shown in FIG. 2.

Once a run and record icon 208 is selected, the system 100 may initiate a sprinkler zone run for a given zone 116 and the user device 112 may enable a camera 104a that is a component of the user device 112. FIG. 3 is an illustration of an example user interface 300 that may be displayed in response to the user's selection of a run and record icon 208. By way of example, the user interface 300 of FIG. 3 indicates a user selection of a run and record icon 208 for the first yard zone 1. The user interface 300 may include a camera window 304 that displays a current view of the camera 104a associated with the user device 112. In some embodiments, the camera 104a may automatically begin recording once the user selects a particular run and record icon 208. Thus, the camera window 304 may display images that are currently being recorded and stored by the user device 112. In an alternate embodiment, the user interface may include an icon to initiate a sprinkler zone run and a separate icon to enable the camera to record an image. In this manner, the sprinkler zone run and image recordation can be initiated separately at different times. In the embodiment shown in FIG. 2, the user interface 300 may additionally include a stop icon 308 that, when selected, may end the recording session and cause the image data to be stored. In some embodiments, selecting the stop icon 308 additionally causes the image data to be automatically uploaded to the server 110 or other network node for further processing. In an alternate embodiment, the stop icon 308 may also end the sprinkler zone run or there may be a separate stop icon to end the sprinkler zone run separate from the recording session. In yet another embodiment, the user may directly shut off the sprinkler to end the sprinkler zone run.

A user may select a given run and record icon 208 for a number of possible reasons. In one example, a user may select a particular run and record icon 208 to obtain diagnostic information regarding a sprinkler system and sprinkler system component associated with the selected run and record icon 208. For example, the user may select a particular run and record icon 208 to obtain image data for a malfunctioning sprinkler head within the particular zone that corresponds to the selected run and record icon 208. In another example, a user may select a particular run and record icon 208 to obtain image data for sprinkler patterns or other data that may be used to analyze sprinkler system effectiveness. When a user selects a particular run and record icon 208, the corresponding sprinkler zone may run regardless of the watering schedule 212 currently set and displayed on the user interface 200. In one example, the run may override the watering schedule 212, such that the watering schedule 212 does not proceed during the time of the run. In another example, the run may cause the watering schedule 212 to adjust. For example, if the run is executed from 5 PM-5:30 PM and a schedule watering event is for 5:30 PM to 6 PM, then the scheduled watering event may be skipped. In yet another example, the watering schedule may be executed normally regardless of the run.

Together FIGS. 2 and 3 illustrate user interfaces that allow a homeowner or operator of a sprinkler system to obtain image data for one or more sprinkler zones via a user device 112. The user interface 200 of FIG. 2 may be used to select a particular sprinkler zone 116 and enable a camera 114a that is associated with the user device 112. With the camera 114a enabled, the user may then capture image data, such as still images or video, of the zone run by maneuvering the user device 112 such that the sprinkler zone is within the field of view of the camera 114a associated with the user device 112. The user interface 300 of FIG. 3 may be used during the recording session. As shown in FIG. 3, the camera window 304 may display the camera output that results from the user's positioning of the user device 112. When a sufficient amount of video is captured, the user may select the stop icon 308 in order to stop the current recording session and to store and/or upload the captured image data.

It should be appreciated that the user interfaces of FIGS. 2 and 3 provide one example of an embodiment in accordance with the present disclose for capturing and uploading sprinkler system image data. Other embodiments in accordance with the present disclosure do not necessarily use a mobile device to capture and upload image data. In one example, the system 100 may capture and upload sprinkler system image data via one or more stand-alone cameras 114b-n that may be maintained on the property associated with the sprinkler system. For example, the system 100 may utilize an outdoor security camera for capture of sprinkler system image data. In this implementation, the outdoor security camera may be in communication with the system 100 such that security camera or the security system itself is enabled to upload image data to the server 110 or other network node for further processing.

FIG. 4 is an example illustration of a camera configured to change positions at different time intervals to capture image data from different irrigation zones, as the zones are activated or at other predetermined intervals. In this example, the camera 350 is a security camera fixed to the side of a building, such as a house. The camera has a particular field of view when it is fixed in a single position. As illustrated, the camera may move between different positions. It is contemplated that such motion of the camera may be automatic, controlled by the sprinkler controller or system, or it may be controlled by a user. As shown, when the camera 350a is in a first position, its field of view covers irrigation zone 2. When the camera 350b is in a second position, its field of view covers irrigation zone 1. While the example in FIG. 4 shows only two positions for the camera covering two irrigation zones, numerous positions are contemplated covering various irrigation zones. However, it is also contemplated that the camera is fixed and cannot move positions. While the example shows irrigation zones 1 and 2 overlapping, it is also contemplated that the irrigation zones may be separate, distinct zones. Further, while only one camera is depicted, there may be several cameras positioned around the building to capture image data for various zones.

In one example, the sprinkler system is coupled to or otherwise in communication with the camera 350, such that as the first zone is activated, the sprinkler system directs the camera to the first position 350a, when the second zone is activated, the sprinkler system directs the camera to the second position 350b covering the second zone, and so forth. The communication between the sprinkler controller/server and/or the camera 350 may be direct or may be through a predetermined scheduling alignment to allow the sprinkler zones and the camera field of view to be synced together. Due to the syncing of the camera 350 position or field of view and the sprinkler zones, the sprinkler system can accurately capture operation of the sprinkler valves and the vegetation watered by each of the zones. In another example, the camera 350 may be instructed to capture images of the various zones separate from operation of the sprinklers and optionally at intervals over time. In this manner, the camera 350 can capture images of the vegetation over hours, days, weeks, or even months, which can then be used (along with meta data related to the captured image, e.g., time, date, weather, etc.) to refine the watering schedules or the like.

Figure 5:
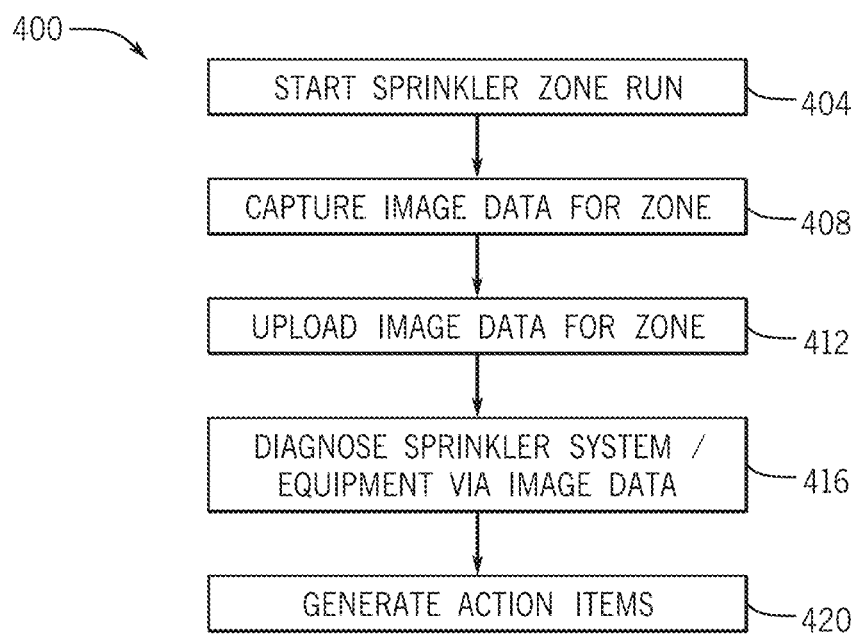
FIG. 5 is a block diagram illustrating a method in accordance with the present disclosure of diagnosing a sprinkler system or sprinkler system equipment using image data.

FIG. 5 illustrates a method 400 of diagnosing a sprinkler system or sprinkler system equipment using image data. The method 400 may begin with operation 404 in which at least one sprinkler system zone run is initiated. In one example, the zone run is initiated by a homeowner, property manager, or other individual who operates or maintains the sprinkler system locally at its point of instillation. The homeowner or other user may initiate the zone run via a specialized application running on a user device 112, such as a mobile or cellular phone. In another example, the zone run is initiated from a remote location such as by a command issued to the controller 102 by the server 110. In yet another example, the zone run is automatically initiated by the controller 102 implementing an established watering schedule. Once the zone run is initiated, then the method 400 may proceed to operation 408.

In operation 408, image data of the zone run is captured. In those cases where the zone run is initiated locally via a user device, the user device 112 may also be used to capture the image data. For example, the specialized application running on the user device 112 may include programming that automatically enables a camera 114a associated with user device 112 when the zone run is initiated. The user may then capture image data, such as still images or video, of the zone run by maneuvering the user device 112 such that sprinkler zone is within the field of view of the camera 114a associated with the user device 112. In some cases, the camera 114a is automatically enabled such that no further action need be taken by the user to capture image data for the zone run. In other cases, the user may initiate the image capture by pressing a record button or icon that is associated with the device's camera function. In yet another example, a separate or standalone camera may be used to capture the image data and the server 110 may transmit record or capture instructions to the camera automatically or provide user instructions to activate the camera.

The timing of image capture may vary with the watering schedule. In one example, the image data may be captured simultaneously with each sprinkler zone run. In this example, the image capture schedule may align with the watering schedule. For example, a sprinkler may automatically turn on every Monday from 6:00 AM-6:30 AM. A camera covering the same area as the sprinkler may be set to record image data at the same time every Monday. In another example, it may be determined that the sprinkler system needs to be tested after a certain period of time. For example, the system may need to be tested every month or every other month. As one example, the system may send an alert to a user on the first of every month to conduct a system diagnosis. Upon receiving the alert, the user may capture image data using his or her user device 112 during the zone run. Once the image data for the zone run is captured, then the method 400 may proceed to operation 412.

In operation 412, image data of the zone run is uploaded to the server 110. As mentioned, the image data of the zone run may have been captured via a camera 114a associated with a user device 112 such as a mobile or cellular phone. In this example, the user device 112 may additionally be used to upload the image data to the server 110. More specifically, the user device 112 may transfer the image data via a local WiFi or cellular connection across the network to be received and stored at the server 110. This transfer of the image data may be facilitated by dedicated programming associated with the specialized application used to capture the image data. A local copy of the image data may or may not be retained at the user device 112. In an alternate embodiment, image data may be retrieved from a memory location, such as, for example, a cloud server, instead of directly from the camera. In yet another embodiment, the image data may have been captured by a standalone camera that may automatically upload the image data to the server 110 during or after recordation. Once the image data for the zone is uploaded to the server 110, then the method 400 may proceed to operation 416.

In operation 416, the sprinkler system or sprinkler system equipment is diagnosed. Here, the data stored at the server 110 may be shared across the network with one or more experts, expert systems, technicians, or other specialist to determine any malfunctions that may be occurring with the sprinkler system or a sprinkler system component that is shown in the image data. Image data stored in the server 110 may be compared with external sources of information that may include product databases, historical image data, schematics, and so on. However, it is also contemplated that the information used for comparison (e.g., historical image data) may also be stored on the server 110. Use of these sources of information may assist a technician or other skilled person in diagnosing malfunctions or other issues that may be identifiable from the stored image data.

In some embodiments, the server 110 may be able to automatically detect equipment defects or failures. In these embodiments, analysis of the watering patterns and/or the equipment itself within the image data by the server 110 or other processing element may reveal a defect in the sprinkler system or the equipment. For example, the processing element can analyze the angle of the spray pattern, the area and/or location of vegetation coverage, the sprinkler rotation pattern, and the like, as compared to similar images of a normal functioning sprinkler head to determine whether the sprinkler is properly functioning. The comparison of image data may use a smart learning algorithm or a pixel by pixel comparison to assess any defects. Two examples of watering pattern analysis are shown in FIGS. 7 and 8. FIG. 7 shows an analysis of a spray span 710 for spray pattern 706, which will be discussed in more detail below. FIG. 8 shows an analysis of a sprinkler rotation pattern and field of reach for spray pattern 806, discussed in more detail below.

In another example, water flow may be analyzed to assess a malfunction of the sprinkler. For example, the coverage area of the sprinkler and the size of the water droplets may be measured through the image data to determine total amount of water dispensed by the sprinkler head. These measurements may be made by counting pixels, smart learning algorithms, or the like. In one example, a reference object of known size may be placed within the area (or identified within the area) captured by the camera and used to scale the watering measurements. Alternatively, the reference object may be used to estimate the size of other objects within the image without using pixels. In another example using video data and image sequences, the size of the water droplets may be measured and, using the length of time of the recording, the flow rate may be estimated. Alternatively, the size of the water droplets may be estimated based on sprinkler specifications. For example, the size of the sprinkler head and size of its nozzles may be known and input into the system to determine the size of the droplets. Sprinkler specifications may be input into the system by a user or may originate from a separate database, such as a manufacturer's database, linked to the system. The determined water flow may be compared to known water flow for a normal functioning sprinkler to assess for any defects in the sprinkler causing disruptions in water flow. Alternatively, an image of the equipment itself may show visual defects (e.g., clogged nozzles, chips, broken or missing parts, and the like). Once the sprinkler system or sprinkler system equipment is diagnosed, then the method 400 may proceed to operation 420.

In operation 420, the system may generate action items in response to the diagnosis made in operation 416. As one example, one or more tickets may be generated that address issues identified in the diagnosis. In the example of a malfunctioning sprinkler head, it may be the case that the diagnosis indicates no part damage, but an incorrect installation. In this case, a ticket may be generated that specifies a service call. The ticket may be sent across the network 114 to an appropriate network node where the ticket can be processed and an appropriate service call scheduled. Continuing with the example of a malfunctioning sprinkler head, it may be the case that the diagnosis indicates a damaged part. In this case, multiple tickets may be generated in response. A first ticket may be generated that specifies a part order for a replacement part. A second ticket may be generated that specifies a service call for repair. The tickets may then be sent across the network 114 to appropriate network nodes where the first ticket can be processed such that a part is ordered and the second ticket processed such that an appropriate service call is scheduled. The first and second tickets may be coupled within the system 100 such that the service call is not scheduled until the part arrives or is expected to arrive. As another example, the action item may be an alert to a user that the sprinkler system or a particular component of the sprinkler system is broken or defective or needs to be replaced. In this manner, the user may determine whether to take action to repair or replace the defective system or component.

Figure 6:
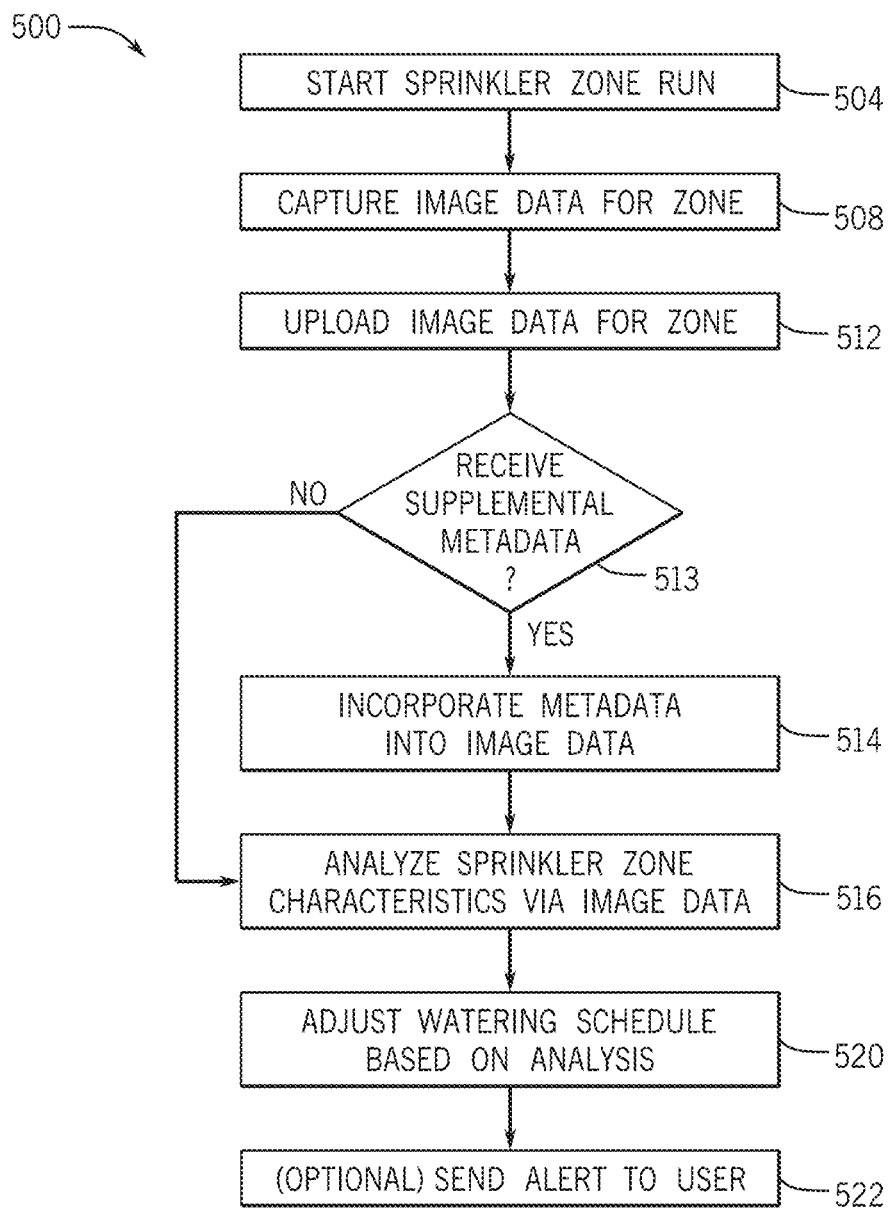
FIG. 6 is a block diagram illustrating a method in accordance with the present disclosure of adjusting parameters in a sprinkler system using image data.

FIG. 6 illustrates a method 500 of adjusting parameters in a sprinkler system using image data. The method 500 may begin with operation 504 in which at least one sprinkler system zone run is initiated. In one example, the zone run is initiated by a homeowner, property manager or other individual who operates or maintains the sprinkler system locally at its point of installation. The homeowner or other user may initiate the zone run via a specialized application running on a user device 112, such as a mobile or cellular phone. In another example, the zone run is initiated from a remote location such as by a command issued to the controller 102 by the server 110. In yet another example, the zone run is automatically initiated by the controller 102 implementing an established watering schedule or a testing watering schedule. Once the zone run is initiated, then the method may proceed to operation 508.

In operation 508, image data of the zone run is captured. In those cases where the zone run is initiated locally via a user device, the user device 112 may also be used to capture the image data. For example, the specialized application running on the user device 112 may include programming that automatically enables a camera 114a associated with user device 112 when the zone run is initiated. The user may then capture image data, such as still images or video, of the zone run by maneuvering the user device 112 such that sprinkler zone is within the field of view of the camera 114a associated with the user device 112. In some cases, the camera 114a is automatically enabled such that no further action need be taken by the user to capture image data for the zone run. In other cases, the user may initiate the image capture by pressing a record button or icon that is associated with the device's camera function.

The timing of image capture may vary with the watering schedule. In one example, the image data may be captured simultaneously with each sprinkler zone run. In this example, the image capture schedule may align with the watering schedule. For example, a sprinkler may automatically turn on every Monday from 6:00 AM-6:30 AM. A camera covering the same area as the sprinkler may be set to record image data at the same time every Monday. In another example, it may be determined that the lawn needs to be tested after a certain period of time. For example, the vegetation health may need to be tested every day, every other day, once a week, or the like. As one example, the system may send an alert to a user every other Tuesday to conduct a health test check. Upon receiving the alert, the user may capture image data to be analyzed for vegetation health using his or her user device 112.

In some embodiments, the zone run may be omitted and images of the zone areas may be captured independently of the zone operation. For example, the user may position one or more video cameras to capture one or more segments of a zone and then the video cameras may be configured to automatically capture and transmit images to the server (e.g., a WiFi connected camera). These images may be captured at select intervals (e.g., once a week, every day, etc.) and/or may be activated by a user or the system when desired. In these embodiments, the image data may include information corresponding to the vegetation in the zone and the color of the vegetation. As discussed below, this may be used by the system to determine variations in the watering schedule. Once the image data for the zone run is captured, then the method 500 may proceed to operation 512.

In operation 512, image data of the zone run is uploaded to the server 110. As mentioned, the image data of the zone run may have been captured via a camera 114a associated with a user device 112 such as a mobile or cellular phone. In this example, the user device 112 may additionally be used to upload the image data to the server 110. More specifically, the user device 112 may transfer the image data via a local WiFi or cellular connection across the network to be received and stored at the server 110. This transfer of the image data may be facilitated by dedicated programming associated with the specialized application that was used to capture the image data. A local copy of the image data may or may not be retained at the user device 112. Once the image data for the zone is upload to the server 110, then the method 500 may proceed to operation 513.

In operation 513, it is determined whether supplemental metadata, such as user and/or zone metadata, is received. The supplemental metadata may include any subsidiary data associated with the image, such as, for example, time stamp information, weather data, regional data (e.g., from a GPS associated with the camera and/or user device, user account information, user input), or other contextual information or user input. As one example, an application for a user device may include a thumbs up or thumbs down icon (or other type of user input) that can be input by a user along with the image data to determine user satisfaction with the vegetation or sprinkler system. For example, an image may show areas with brown vegetation, which may correlate to a need for increased watering, but in some instances may be desirable to a user to save water resources. In this case, a user may input a thumbs up or other user approval input, to indicate user satisfaction with the brown color or state of the zone vegetation. When user metadata is received, the operation may proceed to operation 514.

In operation 514, the metadata is incorporated into the image data to enhance the analysis and outcome determination of the image data. In this manner, the metadata may be easily retrieved from the image data and all relevant information surrounding the image, such as, for example, the image itself, the time the image was captured and uploaded, the location where the image was taken, and any additional user input may be conveniently stored. Once the metadata is incorporated into the image data or in the case where no metadata is received, then the method 500 may proceed to operation 516.

In operation 516, the image data is analyzed based on sprinkler zone characteristics. Sprinkler zone characteristics may include watering patterns (e.g., flow rate, watering times, watering amount per time period, angle of water flow, sprinkler rotation patterns, spray span, projection, and field of reach, and the like), vegetation health (e.g., vegetation height, color, thickness, coverage, growth over time, and the like), or other parameters that may be used to indicate an effective watering. Here, the data that is stored at the server 110 may be shared across the network with one or more experts, expert systems, technicians, or other specialist to determine any watering effectiveness characteristics or features that may be shown or identifiable in the image data. Image data stored in the server 110 may be compared with external sources of information that may include historical watering patterns, water consumption table, plant and vegetation database, satellite images, and so on. However, it is also contemplated that the information used for comparison (e.g., historical watering patterns) may also be stored on the server 110. Use of these sources of information may assist a technician or other skilled person in identifying needed, desired or suggested improvements or changes to watering patterns or schedules that may be identifiable from the stored image data.

In one example, the comparison may be done automatically by one or more processing elements, such as those on the server. In these embodiments, one or more pixels corresponding to vegetation may be analyzed to compare the color value against known ranges of color values for the vegetation. For example, a color database of vegetation ranging from different conditions can be used to quickly determine the health of vegetation captured in the image data. The pixels compared to the color database may be selected through a comparison with known vegetation images. In other words, in some instances, the image data may first be analyzed to determine the types of vegetation contained therein and then the select pixels corresponding to certain vegetation types may be further compared to determine health and determine any adjustments needed in the watering schedule.

In another example, vegetation specifications (e.g., height, thickness, coverage, and the like) may be analyzed to determine vegetation health. As mentioned, a reference object of known size may be placed within the area captured by the camera and used to measure vegetation height and/or thickness. Vegetation thickness and coverage may be estimated by measuring the areas covered by vegetation and comparing it to the overall area covered in the entire image. For example, the vegetation may cover a quarter of the overall area covered in the image. The data determined in this analysis may be compared to historical data indicating vegetation specifications for healthy vegetation. Historical data may have been previously determined and stored when the vegetation was healthy. Alternatively, the image may be directly compared to a reference image of healthy vegetation obtained from an image database to assess differences in vegetation height, thickness, and coverage. For example, the images may be overlaid and areas where there is additional or missing vegetation may be highlighted. The percentage of additional vegetation versus missing vegetation may be assessed to determine whether the vegetation is healthy compared to the healthy vegetation in the reference image.

In the case where metadata has been incorporated into the image data at operation 514, the metadata may be factored into the analysis of the image data. For example, the time stamp information may be used to determine flow rate and watering times. If user input has been received, the analysis of vegetation health may assess actual health (excluding user input) and desired health (incorporating user input). For example, if the image data shows brown vegetation, this may indicate an unhealthy lawn. However, if user input indicates user satisfaction with the brown vegetation, then the system may determine that desired vegetation health has been achieved. Once the image data is analyzed, then the method 500 may proceed to operation 520.

In operation 520, the system 100 may generate adjustments to the local sprinkler system based on the analysis made in operation 416. These adjustments may take the form of commands sent across the network 114 to be received by a flow controller 102 or other component of the local sprinkler system. In one example, a command may be sent across the network that adjusts a flow rate of one or more of the flow controllers 102. For example, in a multiple sprinkler grid, a particular sprinkler may be used more frequently or may dispense water at an increased flow rate to compensate for a faulty sprinkler. For example, the normal functioning sprinkler and the faulty sprinkler may cover generally the same area, such that increased use of the normal functioning sprinkler may compensate for the faulty sprinkler either not working or only working at a percentage of its capacity. In another example, a command may be sent across the network that makes an adjustment to a watering schedule that is implemented by the local sprinkler system. By way of example, such commands may make adjustments to a local watering schedule on an hourly, daily, weekly, or monthly basis. In some cases, determining watering needs may include adding or removing duration or frequency of a zone run.

In the example where image color data is analyzed to determine vegetation health, the image color data may also correlate to certain changes in the watering schedule. For example, an image of a brown or bluish green vegetation may indicate that the vegetation is underwatered, triggering a system response to increase watering time, frequency, and/or amount. As another example, an image of a deep rich green vegetation may indicate that the vegetation is overwatered, triggering a system response to decrease watering time, frequency, and/or amount. However, as mentioned, user input may factor into the system response, and user input indicating satisfaction with the vegetation may prevent the system from adjusting the watering schedule when it otherwise would do so to improve vegetation health or prevent overwatering. In the example where vegetation specifications (height, thickness, coverage) are analyzed to determine vegetation health, the vegetation specifications may correlate to certain changes in the watering schedule. For example, an image containing tall, thick, and widely prevalent vegetation may indicate that the vegetation is overwatered, triggering a system response to reduce watering. As another example, an image containing short, thin, and disperse vegetation may indicate that the vegetation is underwatered, triggering a system response to increase watering.

In one example, the system may designate a portion of vegetation as a health test area, e.g., a set out area or percentage of the zone vegetation. The health test area may be a representative selection of one or more various types of vegetation in the zone. In this example, the system may capture only images of the health test area and compare those against both historical images and an image database to determine adjustments to the watering schedule. Alternatively, the system may capture images of the entirety of the zone area, but may focus the color analysis on the health test area.

In some embodiments, the user may also set a lower "green" threshold for the zone by selecting a desired green (or other color) corresponding to a water-amount for the health test area and this selection may be used to calibrate the algorithm. For example, the user may select a green level of 2 on a 1 to 5 scale, which may correspond to a greenish-brown color of the vegetation, e.g., a low watering level that is sufficient to keep the vegetation alive, but not very lush. Using this water threshold, the system may compare the current image data of the vegetation to the set level, rather than a standard level, to assess whether to make changes to the watering schedule. In this example, the watering schedule can be reduced further than would otherwise occur due to user preference. Alternatively, the user may set the threshold to 5, and the watering schedule would increase to ensure that the vegetation is greener/lusher than would typically occur with normal watering schedules.

After operation 520, the method 500 may proceed to operation 522 and an alert may be sent to the user. In one example, the alert may be a message to a user that the water schedule has been adjusted or it may be a request to a user inquiring whether to adjust the water schedule. In another example, the alert may notify a user of the vegetation health and provide a recommendation for an adjusted watering schedule.

In some embodiments, the method 500 may be conducted over a period of time to determine trending vegetation health and generate a long term watering plan. For example, images may be periodically captured over a period of time, such as, for example, over a season or over a year. In one example, analysis of image data over the course of a year may indicate seasonal changes in vegetation health and a need to adjust the watering schedule according to the season. For example, vegetation may be less healthy after a long winter and watering may need to be increased at the beginning of spring. However, with spring rain, the health of the vegetation may improve, such that as spring progresses, the watering schedule may be adjusted to reduce watering. Such trends in vegetation health with the season may be determined by correlating image data to the time of year it was collected. The system can continually assess vegetation health to determine whether vegetation health is trending up or down over time, in order to allow the user to make long term decisions about the overall watering plan and landscape (e.g., vegetation type). In these examples, the image data captured by the camera, along with metadata associated with the image (e.g., watering schedule and weather at the time of image capture) is stored and used to track changes in the vegetation over time by the server.

Tracking changes in vegetation health over time can be done in numerous ways. For example, the images may be captured from the same field of view over time. The same pixel locations for the series of images may be compared to determine changes in color (e.g., green to brown, blueish green to lush green) to determine changes in vegetation health over time. As another example, the vegetation height, thickness, and coverage may be compared by overlaying images or a side-by-side analysis to determine changes in vegetation health over time. In one example, each image may be analyzed discretely and the vegetation health may be quantified. For example, vegetation health may have a numerical rating (e.g., healthy 1 to unhealthy 5, or the like). The ratings correlating to each discrete image data may be compared and tracked. In this manner, images may not need to be stored; rather, only the data extracted from the images (e.g., vegetation health and time) may be stored, reducing memory storage over time. Such data may show a gradual increase or decrease in vegetation health over time or it may show an abrupt change in vegetation health at a particular point in time. For example, the data may show the vegetation health went from a 5 at time T1 to a 4 at time T2 to a 3 at time T3 to a 2 at time T4 to a 1 at time T5, thus increasing in health gradually over time. Alternatively, the data may show the vegetation health went from a 1 at time T1 to a 5 at time T2. This may indicate a stressful event to the vegetation that lead to a sharp decline in vegetation health. For example, a fire, lightning strike, or infestation may result in a sharp decline in vegetation health.

Trending health may indicate irrigation system efficiency or inefficiency over time. For example, if brown spots form in only a portion of a zone, then the system may determine that there is irrigation system inefficiency in that zone and recommend a change in watering patterns. Alternatively, if unhealthy or low watered vegetation is observed over time, the system may recommend repairs to the system, a change in vegetation type, or a change in the watering schedule. If an assessment of watering patterns indicates unusually low frequency, duration, or timing of watering events, then the system may recommend increasing watering events. However, if an assessment of watering patterns indicates typical or normal watering events or overwatering, then the system may reduce watering events, e.g., reducing frequency or length of time for each watering run. Reducing watering events may allow the vegetation to grow longer roots and develop better overall health over time.

FIGS. 7 and 8 show examples of how the system may analyze acquired image data to diagnose the sprinkler system and its components. FIG. 7 shows an image comparison of an acquired still image 702 of a sprinkler spray head spray pattern 706 to a reference image 700 of a normal spray pattern 704 for the same sprinkler. The reference image 700 may be obtained from an image database. For example, the reference image 700 may have been captured and stored as historical image data by a user or automatically by a security camera when the sprinkler was first installed or within a time of its installation when the equipment was expected to function properly. As shown in FIG. 7, the shapes of the spray patterns 704 and 706 may be compared. Such comparison may be performed by overlaying the images or by a side-by-side comparison of the images. Spray patterns produced by the sprinkler spray heads include a spray span, a spray volume, a spray distance, an angular projection, a coverage area, and the like. Such parameters may be measured and compared to determine differences in the spray patterns. In one example, geometric measuring techniques can be used to measure sizes and distances within the spray patterns and such measurements can be scaled (e.g., by a reference object of a known size within the image) to determine the actual size and distance of the spray pattern. As shown in FIG. 7, the spray patterns 704, 706 each have a spray span 708, 710. The spray span 708 for the normal spray pattern 704 forms a complete span with water spraying across the distance of the normal spray span 708. While the spray span 710 covers the same distance as the normal spray span 708, there is a gap 712 or other discontinuity at a location of the spray pattern 706, such as in the center of the spray pattern 706, such that the spray pattern 706 does not form a complete span across the distance of the spray span 710.

The discontinuous spray span 710 may indicate that the spray head nozzles associated with the space including the gap 712 may be clogged or damaged. If parameters of the sprinkler are known (e.g., by user input of the sprinkler make and model and a database indicating the specific sprinkler's specifications), the specific nozzles that are damaged may be identified. For example, the number and size of the nozzles on the sprinkler spray head may be known. The location and size of the gap 712 relative to the remainder of the spray pattern 706 may be determined through analysis of the acquired image 702, such as by comparing the acquired image 702 to a previous image of the spray pattern at first installation or when operating properly. In this example, the two images can be overlaid to determine differences between the spray patterns or a smart algorithm, pixel by pixel comparison, or the like, can be used by the processing element to determine differences. By correlating the spray pattern 706 to the nozzles on the spray head, the gap 712 may be assigned or defined as being generated by select nozzles. In other words, to correlate a spray gap to a select nozzle or set of nozzles, the radial or angular location of the gap is traced to a particular radial location on the spray head, depending on the positioning and direction of the spray head. From there, the processing element can estimate or predict the nozzles responsible for the gap. The positioning and direction information can be determined based on the image (e.g., assessing the bounded edges of the spray pattern), as well as a time stamp comparison with the run time of the zone operation. At the beginning of the zone run, it can be assumed that the spray head is at a first direction and if the spray head is a rotating head, it can be assumed that the spray head is at a second direction at 1 second into the zone run. For example, by determining that the gap is occurring at a position of 30 degrees relative to a first axis, the nozzles arranged radially at a 30 degree position may be determined to be the cause of the gap or other spray irregularity. In other words, the location of the gap is detected during the image analysis and the location is then traced backwards by the server 110 to an estimated nozzle location.

In another example, the percentage of faulty nozzles and the percent capacity of the sprinkler head may be determined. For example, 50% of the nozzles may be clogged, indicating that the sprinkler head is functioning at 50% capacity. While a gap 712 is shown, any number and arrangement of nozzles may be faulty leading to multiple gaps across the spray span, including zero flow at either end of the spray span. While FIG. 7 shows the acquired image 702 as a still image, it is contemplated that the acquired image 702 may be a moving image or image sequence.

FIG. 8 shows an image comparison of an acquired image sequence 802 of a sprinkler spray head spray pattern 806 to a reference image sequence 800 of a normal spray pattern 804 for the same sprinkler. The reference image sequence 800 may be obtained from an image database. For example, the reference image sequence 800 may be historical image data previously stored by a user or automatically by the system (e.g., as captured at earlier times by the cameras coupled to the system). As shown in FIG. 8, the spray patterns 804, 806, move to a different position over time, from time T1 to time T3. The normal spray pattern 804 transitions from the left side of the image at T1, to the center of the image at T2, to the right side of the image at T3. The spray pattern is indicative of how the sprinkler moves over time. In this example, the normal functioning sprinkler moves in a 180 degree range of motion. The spray pattern 806 shown in the acquired image sequence 802 transitions from the left side of the image at T1, to just left of the center of the image at T2, and back to the left side of the image at T3. The spray pattern 806 does not cross the center line P. In this example, the sprinkler moves in a 90 degree range of motion.

Using the captured images, the processing element can analyze the images to detect the location of the spray pattern. Using the location, the angular coverage of the spray pattern with respect to the vegetation area can be determined. Using the detected spray range as compared to the manufacturing spray range (e.g., known angular coverage) (or other set data point or information), the system can determine that the sprinkler is broken or damaged, as it cannot move the entirety of its normal range of 180 degrees. For example, by determining the spray pattern angular coverage shown in the image and comparing the detected angular range to a database storing a spray range for the particular spray head (or common ranges for various spray heads), the processing element can determine that the spray pattern is restricted and therefore not operating properly, e.g., the sprinkler is not rotating properly. Using the image analysis and known components of the sprinkler valve, the system can determine a replacement suggestion for the sprinkler head and/or adjust the watering schedules to account for the decreased motion by adjusting the watering time of other zones or sprinkler heads. In this example, because the sprinkler may only move along half of its normal range of motion, the sprinkler may be considered to function at 50% capacity. While the normal range of 180 degrees is depicted in the example shown in FIG. 8, many other sprinkler ranges of motion are possible, such as, for example, a range of 360 degrees.

Figure 9:
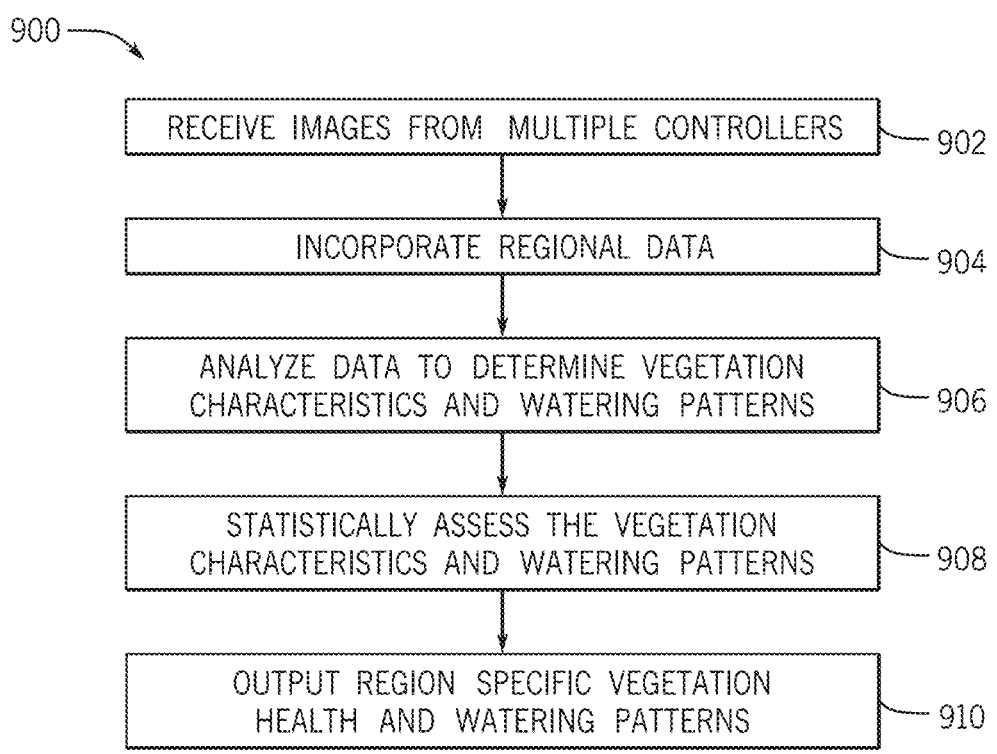
FIG. 9 is a block diagram illustrating a method in accordance with the present disclosure of determining region specific vegetation health and watering patterns.

FIG. 9 illustrates a method of determining region specific vegetation health and watering patterns using the system of FIG. 1. The method 900 may begin with operation 902 and images from multiple controllers (e.g., multiple zones associated with discrete controllers) are received. In one example, the multiple controllers may be located in a particular region, such as, for example, a neighborhood, a city, a zip code area, a county, and the like. In other words, the controllers may be associated with discrete properties or zones within the select region, such that a first controller is associated with a first property having a first set of zones, a second controller is associated with a second property having a second set of zones, and so on. The image data may be acquired and stored over time. For example, image data may be received hourly, daily, weekly, or monthly from each controller. The image intervals may be varied depending on the desired analysis data points desired. Once the multiple images are received, then the method 900 may proceed to operation 904.

In operation 904, regional data is incorporated into the image data. Regional data may include zip code, name of region, regional coordinates, specific location of each controller within the region, and the like. Regional data may also include topographical information (e.g., the location and slope of hills in the region), water feature sizes and locations (e.g., lakes, rivers, streams, and the like), weather patterns (e.g., temperature, pressure, humidity, precipitation, and the like), zoning (e.g., residential or industrial regions), and the like. Once regional data is incorporated, then the method 900 may proceed to operation 906.

In operation 906, the data is analyzed to determine vegetation characteristics and watering patterns. The analysis may determine vegetation type (e.g., grass, produce, flowers, trees, and the like), height, thickness, coverage, and the like. The vegetation type may be determined, for example, by comparison of the image data to an image database containing known vegetation types. Watering patterns may include watering schedule (e.g., time of year, time of day, duration of watering, volume of water used per watering event, and the like), spray pattern (e.g., angle of spray, shape of spray, spray span, and the like), coverage area, water usage, and the like. The images from different controllers may be compared to one another to determine differences and trends in vegetation health and watering patterns across the region. Once vegetation characteristics and watering patterns are determined, then the method 900 may proceed to operation 908.

In operation 908, the vegetation characteristics and watering patterns are statistically assessed by a processing element. Numerous statistical analyses are contemplated. In one example, vegetation health may be assessed on a scale, for example, from 1 to 5. The percentage of 1s, 2s, 3s, 4s, and 5s can be determined to assess overall health of the region. The numbers may also be mapped to a regional map to assess whether particular areas within the region share similarities in vegetation health. For example, several properties within a particular area within the region may all have 1s, indicating a lush area within the region. In another example, the vegetation type can be analyzed to determine percent coverage of different vegetation across the region. For example, image data may be associated with a particular vegetation type. For example, user input of the vegetation type may be associated with specific image data (e.g., user indicated the image was of Kentucky blue grass), or a certain pixel coloration may indicate a particular vegetation type. The system may use image comparison techniques or artificial intelligence to find similar images containing the same vegetation. The number of images, corresponding to different zones, may be assessed to determine the number of zones containing the particular vegetation type and thus the distribution of the vegetation type across the region. In another example, vegetation height, thickness and coverage determined for each area represented by each controller may be averaged to determine average vegetation height, thickness, and coverage across the region, and therefore average overall vegetation health. In yet another example, watering patterns may be assessed to determine typical watering times and durations, typical coverage area, and typical water usage across the region. In another example, the percentage of watering events occurring at particular times may be determined. For example, 40 out of 100 controllers may input image data between 6 AM and 7 AM, indicating that 40% of the controllers are initiating watering during that time. In another example, total daily water usage for the region may be determined by summing up total daily water usage for each area associated with each controller. For example, total daily water usage may be determined for each image based on flow rate and the watering schedule (e.g., timing, duration, and frequency of watering events over the course of the day). Flow rate may be input into the system (e.g., by a user or a database storing sprinkler specifications) or it may be determined by calculating the water droplet size and the area of spray coverage based on the image data and estimating the number of droplets per area of spray coverage to determine volume of water dispensed within the area of spray coverage. Using the calculated volume of water per area, and the time of the watering event, the flow rate can be determined. Once the vegetation characteristics and watering patterns are statistically assessed, then the method 900 may proceed to operation 910.

In operation 910, region specific vegetation health and watering patterns are output by the system. Region specific vegetation health may be average vegetation health across the region. Region specific watering patterns may be typical watering patterns or trends in the region. In this manner, the system may provide insight into the efficiency of utilities usage and aggregate health for a particular region. This information may also be used to adjust watering schedules across the region by the server 110, such as to equalize vegetation health for a select vegetation species across the region, reduce watering loads at select times, space out watering demands on the water utility, or the like.

Figure 10:
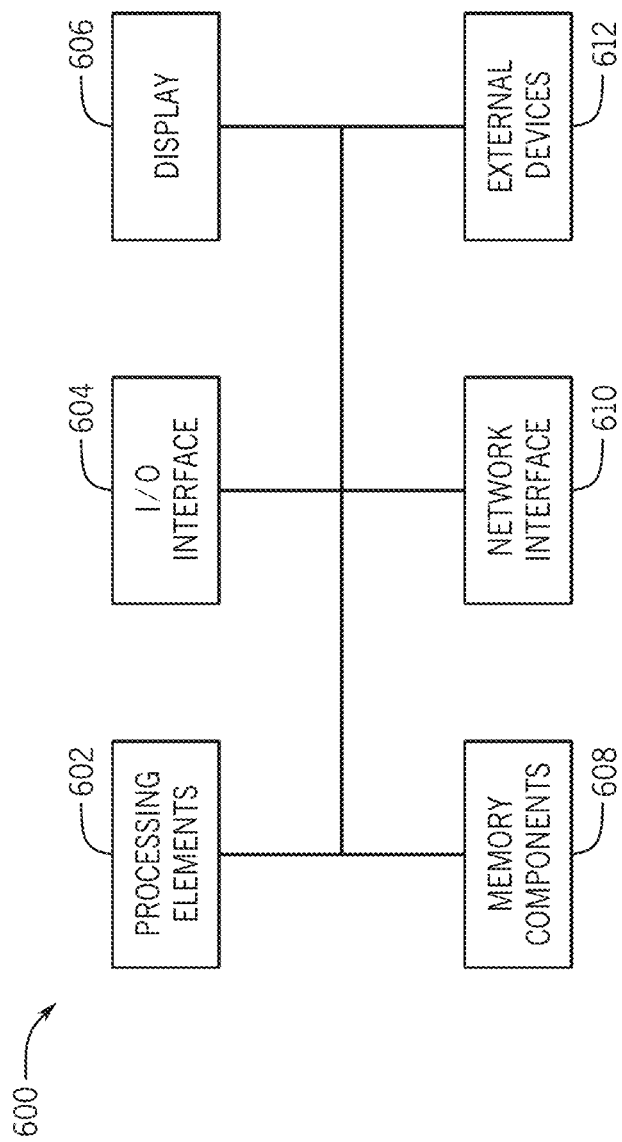
FIG. 10 is a simplified block diagram for a computing device that may be used with the system of FIG. 1 or integrated into one or more of the system components shown in FIG. 1.

A simplified block structure for a computing device that may be used with the system 100 or integrated into one or more of the system 100 components is shown in FIG. 10. For example, the server 110, user device 112, flow controllers 102a-102n, and/or external sources 108 may include one or more of the components shown in FIG. 10 and be used to execute one or more of the operations disclosed in methods 400 and 500. With reference to FIG. 10, the computing device 600 may include one or more processing elements 602, an input/output interface 604, a display 606, one or more memory components 608, a network interface 610, and one or more external devices 612. Each of the various components may be in communication with one another through one or more busses, wireless means, or the like.

The processing element 602 is any type of electronic device capable of processing, receiving, and/or transmitting instructions. For example, the processing element 602 may be a central processing unit, microprocessor, processor, or microcontroller. Additionally, it should be noted that select components of the computer 600 may be controlled by a first processor and other components may be controlled by a second processor, where the first and second processors may or may not be in communication with each other.

The memory components 608 are used by the computer 600 to store instructions for the processing element 602, as well as store data, such as the fluid device data, historical data, and the like. The memory components 608 may be, for example, magneto-optical storage, read-only memory, random access memory, erasable programmable memory, flash memory, or a combination of one or more types of memory components.

The display 606 provides visual feedback to a user and, optionally, can act as an input element to enable a user to control, manipulate, and calibrate various components of the computing device 600. The display 606 may be a liquid crystal display, plasma display, organic light-emitting diode display, and/or cathode ray tube display. In embodiments where the display 606 is used as an input, the display may include one or more touch or input sensors, such as capacitive touch sensors, resistive grid, or the like.

The I/O interface 604 allows a user to enter data into the computer 600, as well as provides an input/output for the computer 600 to communicate with other devices (e.g., flow controller 102, other computers, speakers, etc.). The I/O interface 604 can include one or more input buttons, touch pads, and so on.

The network interface 610 provides communication to and from the computer 600 to other devices. For example, the network interface 610 allows the server 110 to communicate with the flow controllers 102 through the network 114. The network interface 610 includes one or more communication protocols, such as, but not limited to WiFi, Ethernet, Bluetooth, and so on. The network interface 610 may also include one or more hardwired components, such as a Universal Serial Bus (USB) cable, or the like. The configuration of the network interface 610 depends on the types of communication desired and may be modified to communicate via WiFi, Bluetooth, and so on.

The external devices 612 are one or more devices that can be used to provide various inputs to the computing device 600, e.g., mouse, microphone, keyboard, trackpad, or the like. The external devices 612 may be local or remote and may vary as desired.

CONCLUSION

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function (s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of adjusting water parameters in a sprinkler system, the method comprising:
    initiating a sprinkler system zone run for a zone of a sprinkler system;
    automatically initiating a capture of image data for the sprinkler system zone run with the initiation of the sprinkler system zone run;
    transmitting the image data to a network node;
    receiving image data processed at the network node, wherein the processed data includes data on vegetation health of vegetation contained within the image data, and water parameter data; and
    adjusting the water parameters for the sprinkler system based on the water parameter data produced at the network node.

2. The method of claim 1, wherein initiating the capture of the image data includes recording a video from a camera associated with a user device.

3. The method of claim 2, wherein the user device used to capture the image data additionally is used to transmit the image data to the network node.

4. The method of claim 2, wherein the operations of initiating the sprinkler system zone run and the initiating of the capture of the image data are simultaneously triggered through user actuation of an icon provided in a user interface provided by the user device.

5. The method of claim 1, wherein the processed data comprises a comparison of the image data compared to an image database.

6. The method of claim 1, wherein the processed data comprises a result of an analysis of the image data to determine types of vegetation contained therein by comparison of pixels associated with the image data to a color database of the types of vegetation ranging from different conditions to determine health of the vegetation captured in the image data.

* * * * *